United States Patent [19]

Kraeling, Jr.

[11] 4,401,334
[45] Aug. 30, 1983

[54] AUTOMATIC CARGO HOOK

[76] Inventor: John B. Kraeling, Jr., 4210 Roxbury Rd., Erie, Pa. 16506

[21] Appl. No.: 290,779

[22] Filed: Aug. 3, 1981

[51] Int. Cl.³ ............................................. B66C 1/38
[52] U.S. Cl. ............................ 294/83 R; 24/241 SB; 24/233
[58] Field of Search .............. 294/83 R, 82 R, 83 AB, 294/83 A, 75, 78 R, 84; 24/230.5 R, 232, 233, 234, 235, 241 R, 241 SB, 241 P, 241 PP, 241 PS, 241 SP, 242

[56] References Cited

U.S. PATENT DOCUMENTS 1,626,866  5/1927  Neilson ........................... 24/241 SB
3,539,217  11/1970  Szekely ............................. 294/83 R Primary Examiner—James B. Marbert
Attorney, Agent, or Firm—Webb, Burden, Robinson & Webb

[57] ABSTRACT

A self-releasing hook comprising the following basic elements: a hook body having a slot to receive a load ring or the like and a crotch in which the load ring rests when loaded, a plunger for raising the load ring out of the crotch in the hook body, a latch for holding the loaded hook ring within the slot at least prior to loading, a spring for urging the plunger to the ejection position and another spring biasing the latch in a position blocking exit from the slot. The slot is shaped to receive the load ring and permit the latch to return to a latching position while the plunger is in the ejecting position.

20 Claims, 16 Drawing Figures

4,401,334

AUTOMATIC CARGO HOOK

BACKGROUND

Many material handling applications in shipping and industry employ lifting devices such as boom type or overhead travelling type cranes. These cranes utilize a hoisting mechanism attached to a hook assembly to which the load to be lifted is secured. Commonly the load is engaged to the hook assembly by means of a load ring and chain or cable sling assembly. After the load is hoisted and transported to its destination, the load ring is manually removed from the hook assembly.

The procedure of manual load ring removal, in addition to requiring manpower, presents problems where the load must be deposited in dangerous or inaccessible locations.

Many hooked mechanisms have been devised to provide for automatic removal of the load ring upon deposit. These mechanisms eject the load ring by force provided, for example, by an electrically operated solenoid. One spring operated mechanism permits pivoting or opening of the hook jaw or jaws allowing the ring to fall. U.S. Pat. No. 2,582,990 discloses an automatic parachute hook ground release designed to eject the load supporting link when the load is removed. Loading permits a piston to slowly fall out of the locking position while the parachute and load are falling such that when the parachute hits the ground and unloads, the link is ejected by spring action. The falling piston is an unacceptable condition for hooks used in industrial settings. All parts of a hook assembly must remain associated. U.S. Pat. No. 3,539,217 discloses a self-releasing cargo hook with a rotating jaw for opening upon release of load to enable the hook to be drawn away from the load ring. The problem with a rotating jaw mechanism is that the entire load is carried by the pin about which the jaw rotates. The shear strength of the pin is a significant limitation. U.S. Pat. No. 3,918,758 relates to a snap hook having a pivotally mounted release lever that can be manually pulled by a lanyard arranged to lift the load ring from the hook opening once the load has been removed.

It is a purpose of applicant's invention to provide ejection by an internal latching and release mechanism which is completely independent of the load carrying portion of the hook, thus preventing any malfunction or failure of any moving parts or connections thereof from interfering with the safe load carrying capability of the hook. It is a further advantage that no moving parts or connections thereof support any load in excess of those required to facilitate load ring ejection. According to one embodiment, the automatic load ring ejection is completely self-contained requiring no external forces or electrical connections. In this embodiment, mere release of the loading results in ejection of the load ring. In yet another embodiment of the invention a mechanical latch is arranged to be released manually or by a small electrical solenoid. The latch holds off the ejecting function until release. The load must still be removed to permit ejection of the load ring whether or not the mechanical latch has been released.

This application is directed to a device that has the advantages of the above discussed patented devices but avoids the drawbacks of each. It is an advantage of this invention to provide a self-releasing hook that remains assembled and has no parts capable of falling away. It is an advantage of this invention to provide a self-releasing hook that does not have a rotating jaw. It is yet another advantage of this invention to provide a self-releasing cargo hook that can be actuated by pulling of a release latch and/or unloading. Springs within the hooks supply the ejection force.

SUMMARY OF THE INVENTION

Briefly according to this invention there is provided a self-releasing hook comprising the following basic elements: a hook body, a plunger for raising the load ring out of the crotch in the hook body, a latch for holding the load ring within a slot in the hook body prior to loading and at which time the load ring is drawn to the crotch, a spring for biasing the plunger in the up or ejecting position and another spring biasing the latch in a position blocking exit of the load ring from the slot. The hook body comprises an elongate, usually vertically oriented, portion having near one end (its upper end) an opening for receiving a shackle pin or the like and at the other end a slot and crotch defined by the configuration of the hook body. The crotch defines a seat for supporting a load ring. The crotch has an upturned extension from the seat to prevent the load ring from sliding out of the seat.

The latch comprises a bell crank-like shape pivotally mounted to the hook body for restricted rotation. The latch has a first transverse lever arm (which is normally horizontal) and a second perpendicularly directed arm. The second arm has a normal position blocking exit of the hook ring from the slot in the hook body. The latch is arranged to permit the second arm to rotate inward toward the transverse position of the hook body but not outwardly from said normal blocking position. The latch has a surface on one side of the first arm defining a cam follower surface.

The plunger slidably engages the hook body. Preferably the plunger moves within a cavity in the hook body. The plunger is typically L-shaped with a bearing surface against which the load ring bears and an upwardly extending pawl arm. The pawl arm has a cam surface arranged to ride over the cam follower surface of the latch during the loading (downward movement) of the plunger. The cam action rotates the plunger enough to ride past the first arm of the latch. Thereafter, the plunger snaps into a position to engage the first arm.

Thus a load ring or the like may be inserted past the latch into the slot in the hook body to rest upon the bearing surface of the plunger whereupon the ring cannot be withdrawn past the latch. As the load is applied to the ring, it pulls downward to the seat of the hook body carrying the plunger with it. When the load is removed, the bearing surface of the plunger carries the load ring out of the crotch. At the same time, the pawl arm of the plunger kicks the latch out of the blocking position permitting the ring to escape the hook.

According to a preferred embodiment of this invention, the plunger has an inverted T-shape with the upper surface of a lower leg comprising the bearing surface and the means for biasing the plunger upward attached to the other leg. According to yet another preferred embodiment, the upwardly extending leg of the plunger is shaped to envelop the cam follower surface of the latch when the plunger is in its loaded position to thus prevent inward rotation of the latch.

According to a preferred embodiment of this invention, the hook body defines a triangular mouth with one apex comprising the crotch into which the load ring rests and another apex opening to the exterior to thus permit insertion of a load ring into the mouth.

DESCRIPTION OF THE DRAWINGS

Further features and other objects and advantages of this invention will become clear from the following detailed description made with reference to the drawings in which.

DESCRIPTION OF THE PREFERRED EMBODIMENTS

Figure 1:
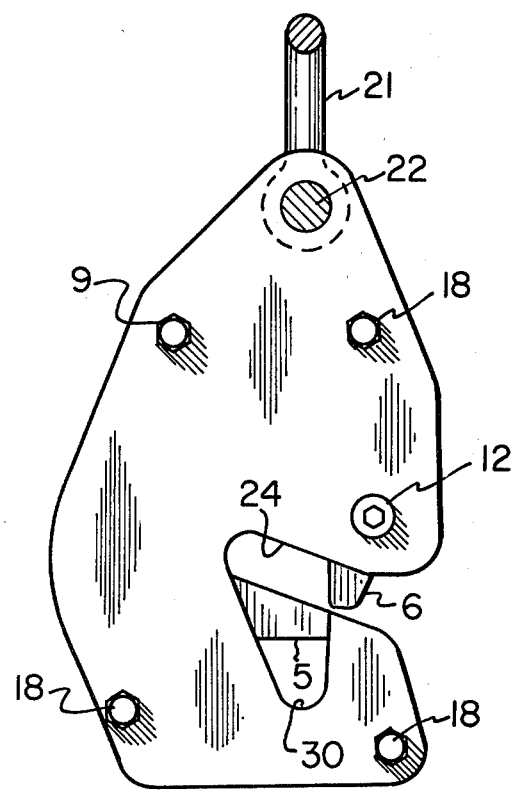
FIG. 1 is a side view of one embodiment according to this invention.
Figure 2:
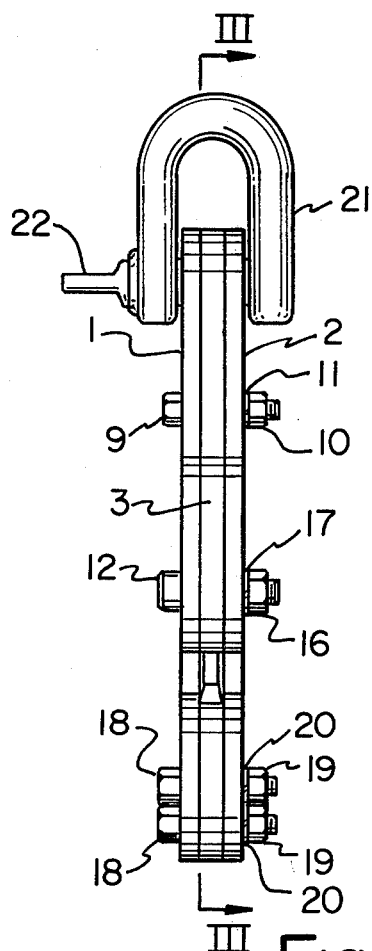
FIG. 2 is a front (edge) view of the same embodiment.
Figure 3:
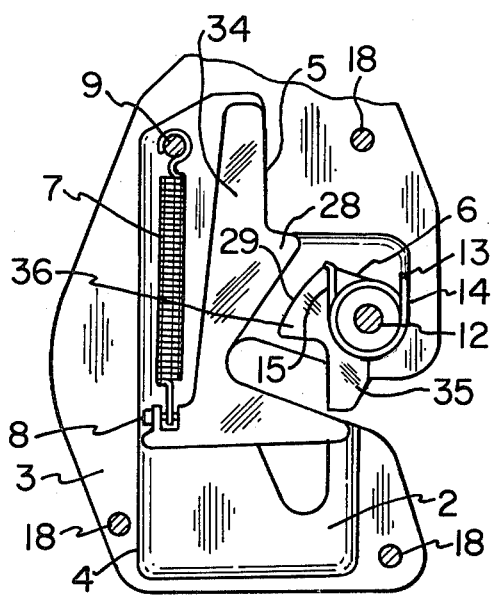
FIG. 3 is a partial section view taken along lines III—III on FIG. 2.

Referring now to FIGS. 1, 2, and 3 which illustrate the side elevation, front elevation (edge), and cross section view respectively of the self-releasing hook according to this invention, the main body of the hook consists of two hook plates 1 and 2 held apart by a spacer plate 3. The hook plates have substantially identical shapes and define a triangular mouth comprising a slot 24 and crotch 30. The load ring or the like rests upon the curved edge of the hook plates in the crotch when a load is being supported by the hook. The slot 24 provides access to the mouth for placing a load ring therein.

A cavity 4 between the spacer plates 3 houses the automatic releasing mechanism according to this invention which comprises a release plunger 5, a latch 6, and a spring 7. The main function of the plunger 5 is to raise the load ring out of the crotch over the upturned extension between the crotch and the slot when the load has been released. The main function of the latch 6 is to hold the load ring in the slot resting on the beveled bearing surface 26 of the plunger prior to loading at which time the load ring is pulled down into the crotch. The plunger 5 has an L or inverted T-shape with the upper edge of one lower leg defining the bearing surface 26. The upwardly extending arm, referred to herein as the pawl arm 34, serves several functions. For one, it has a saw-tooth shaped cam surface 28 which rides over the cam follower surface 29 of the latch and into a lever arm engaging position on the loading movement (downward movement) of the plunger. The latch 6 has a bell crank-like shape and is pivotally mounted in the hook plates by shoulder bolt 12. The latch has a normally downwardly extending arm 35 which, in its normal position, blocks exit of the load ring from the slot. The latch has also a generally horizontal lever arm 36 which is arranged to engage the saw-tooth cam 28 on the pawl arm 34.

The release plunger 5 is held in the uppermost position by the tension of spring 7. The spring is stretched between bolt 8 on the release plunger and the spring bolt 9 between the hook plates 1 and 2. The bolt 9 is secured with a nut and lock washer 10 and 11. The latch 6 mounted on a shoulder bolt 12 is held in the closed position by torsion spring 13 which is torqued between the vertical surface 14 on the spacer plate 3 and the spring locating surface 15 on the latch 6. The shoulder bolt 12 is secured with the nut and lock washer 16 and 17. The assembly is held together by the spring bolt, nut and lock washer 9, 10, 11, the shoulder bolt, nut and lock washer 12, 16, and 17 and additional bolts, nuts, and lock washers 18, 19, and 20. A lifting shackle and pin 21 and 22 are provided for attachment to the crane hook.

Figure 4:
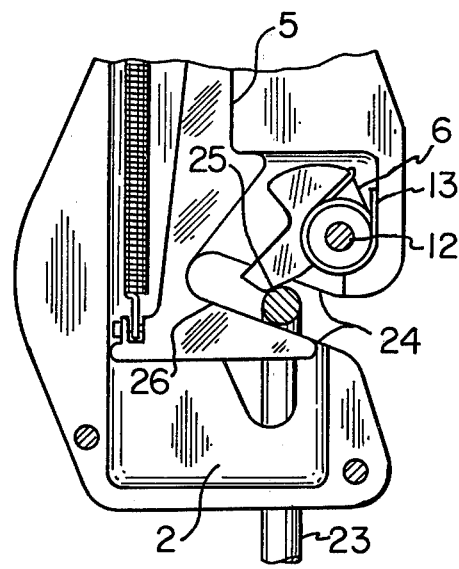
FIGS. 4 to 12 are also partial section views taken along lines III—III of FIG. 2 which illustrate the operation of the self-releasing hook according to this invention.
Figure 5:
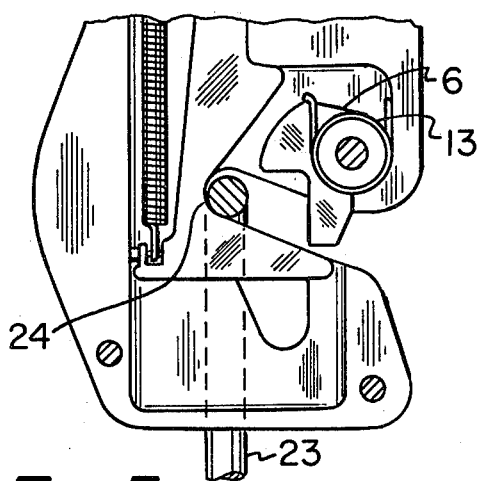
Figure 6:
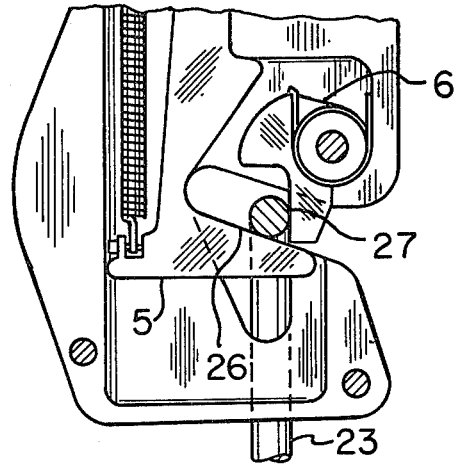

Referring to FIG. 4, the load ring 23 is inserted in the slot 24 between the hook plates 1 and 2 and the release plunger 5. Movement into the slot 24 causes the load ring 23 to engage the forward surface 25 of the latch 6 forcing it to rotate inward on the shoulder bolt 12 against the torsion spring 13. When the load ring 23 reaches the rear of the slot 24 as shown in FIG. 5 clearance permits the action of the torsion spring 13 to reclose the latch 6 to its normal blocking position. Referring to FIG. 6, gravity then causes the load ring 23 to slide down the tapered or beveled surface 26 of the release plunger 5 until it comes to rest and is retained by the rearward surface 27 of the latch 6. The load is now secured for hoisting.

Figure 7:
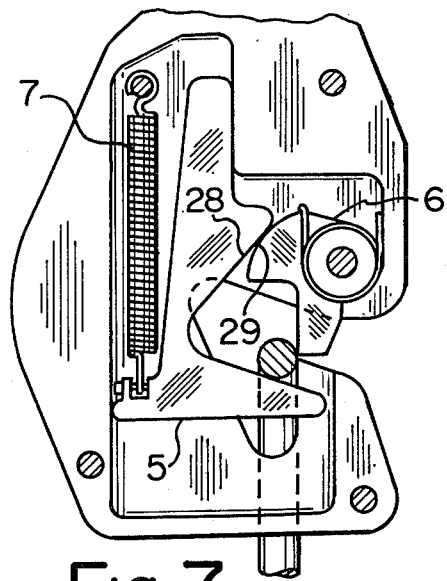
Figure 8:
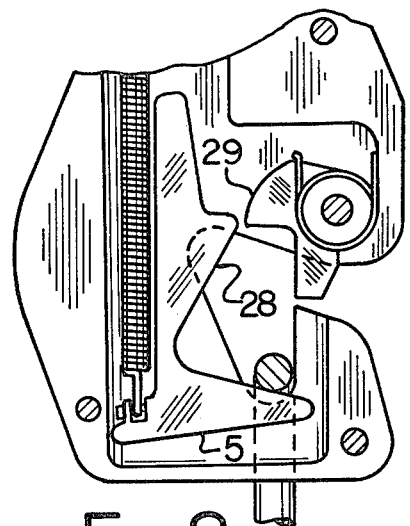
Figure 9:
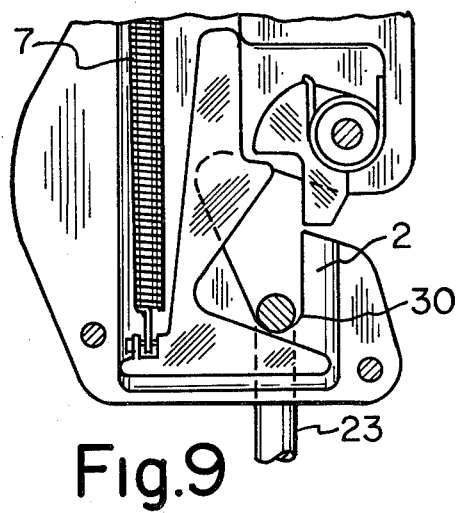

As lifting is taking place, see FIG. 7, the weight of the load overcomes the tension in the tension spring 7 causing the release plunger 5 to travel downward causing contact between its cam surface 28 and the cam follower surface 29 on the latch 6. As downward travel of the release plunger 5 continues as shown in FIG. 8, it is forced to rotate to the rear by the action of cam surfaces 28 and 29. At the same, the interaction of the load ring on the bearing surface and the spring 7 biases the cam surface and cam follower surface together. Just prior to the plunger completing its downward travel, the cam surfaces 28 ride over the cam surface 29 to permit the moment created by the offset of the lifting force and the tension spring force to rotate the release plunger 5 to its original vertical orientation by completion of the downward travel. The load ring 23 rests on the crotch seat 30 of the hook plates 1 and 2 as seen in FIG. 9. This permits the full lifted load to be carried by the hook plates 1 and 2.

Figure 10:
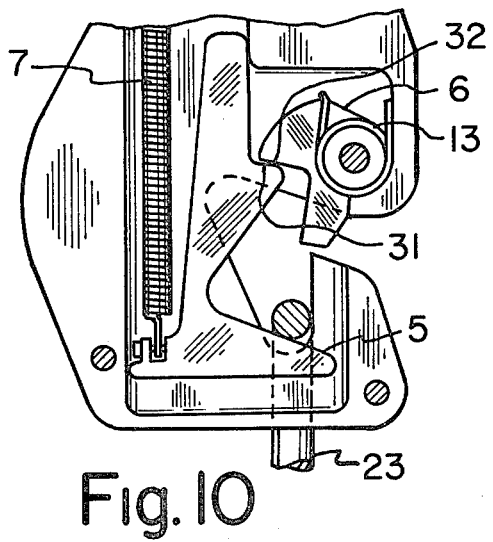
Figure 11:
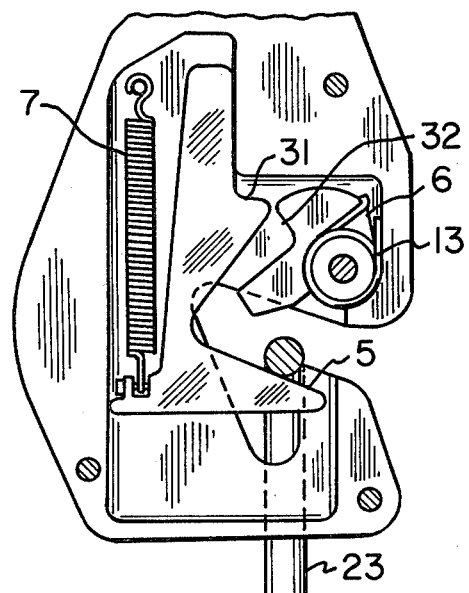

Referring to FIG. 10, after the load has been deposited at its destination, the force of the tension spring 7 overcomes the weight of the now slack load ring 23 and chain or cable sling and lifts the release plunger 5. The flat lifting surface 31 of the release plunger 5 contacts the flat surface 32 of the latch 6 imparting rotation to the latch 6 against the torsion spring 13 causing it to open, as shown in FIG. 11.

Figure 12:
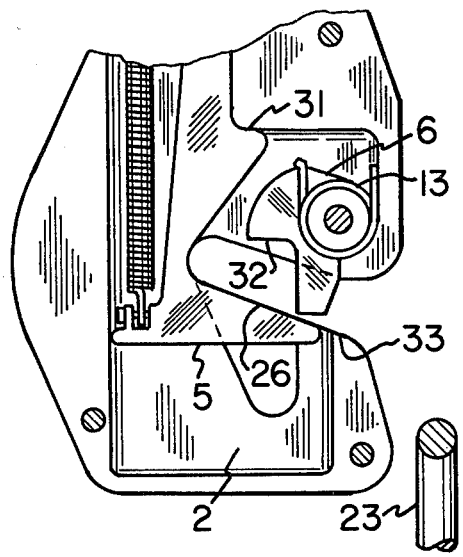

Referring to FIG. 12, as the release plunger 5 reaches the end of its upward travel its tapered surface 26 aligns itself with the tapered surface 33 of the hook plates 1 and 2 and allows the load ring 23 to slide out of engagement. At the same time the flat lifting surface 31 of the release plunger 5 and the flat cam surface 32 of the latch 6 separate permitting the torsion spring 13 to force the latch to close. The self-releasing hook has now released the load ring 23 and is returned to its original position preparatory to a subsequent lift.

Figure 13:
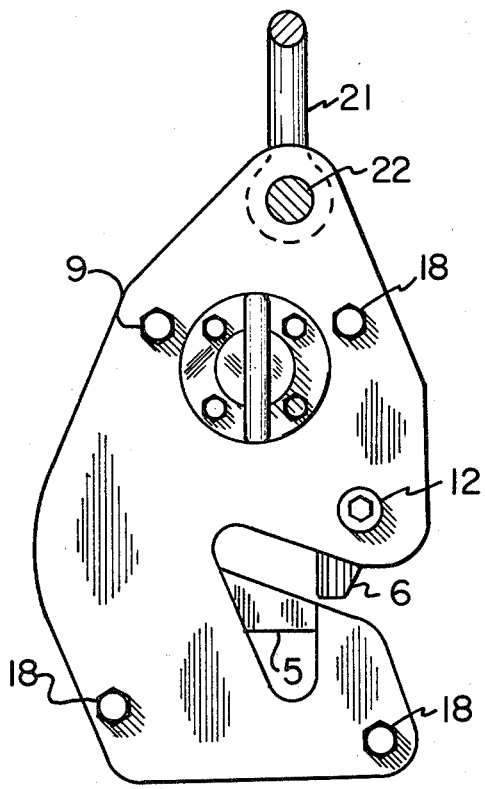
FIGS. 13, 14, 15 are side, edge, and partial section views that illustrate yet another embodiment where a bolt secures the self-release mechanism against actuation.
Figure 14:
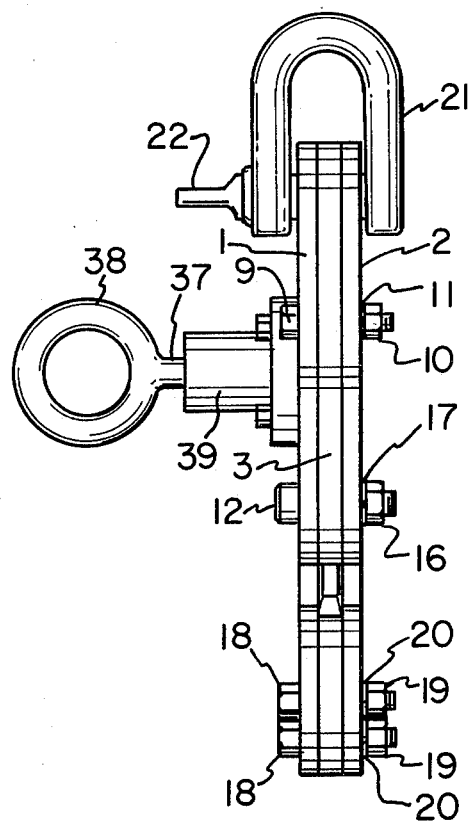
Figure 15:
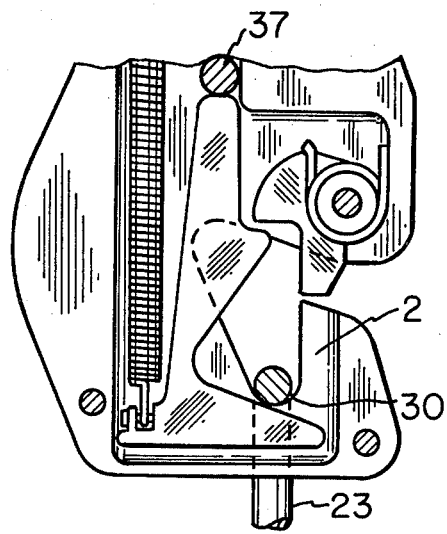

FIGS. 13, 14, and 15 illustrate an alternate embodiment according to this invention. In these figures the numerals less than 37 identify identical elements as described for the first described embodiment. A sliding bolt 37 is guided by a cylindrical housing 39 which contains a spring (not shown) for biasing the bolt toward the hook plates. The sliding bolt 37 has a hook 38. The housing 39 is secured to the face of the hook plate 1 with an axis generally perpendicular thereto. The hook plate has an opening therein through which the sliding bolt passes. The sliding bolt is placed to enter the cavity between the two hook plates at a location where it will obstruct the upward movement of the plunger 5. The bolt presses against a side face of the plunger until the plunger reaches its downwardmost position. At that time, the bolt snaps into the cavity (see FIG. 15). Until the bolt is withdrawn from the cavity, the plunger cannot unload the load ring. The sliding bolt can be attached to an electrical solenoid which, when actuated, retracts the bolt from the cavity. In this way, it is not necessary to have a workman at the load for unhooking. Even though the solenoid is actuated, however, the load ring is not released until the load ring is unloaded.

Figure 16:
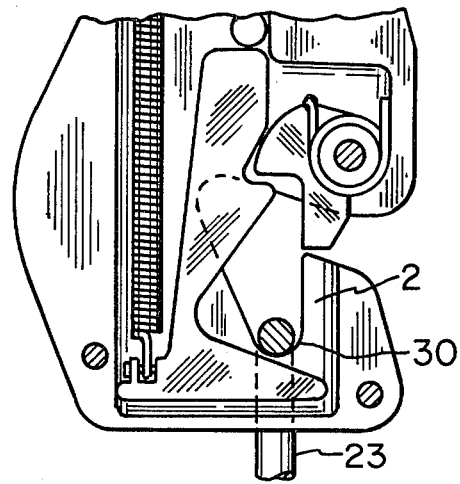
FIG. 16 is a partial section illustrating an embodiment of FIGS. 13, 14, and 15 wherein the latch is firmly secured during the time the bolt secures the self-release mechanism.

FIG. 16 illustrates yet another preferred embodiment. When the sliding bolt is in the cavity, it may be possible for the downward arm of the latch to rotate inward and then the hook ring to slip past it. This is prevented by having the edge of the pawl arm above the saw-tooth cam shaped to envelop the cam follower edge of the latch.

Having thus defined the invention with the detail and particularity required by the Patent Laws, what is desired protected by Letters Patent is set forth in the following claims.

I claim:

1. A self-releasing hook comprising:

hook body, ejection plunger, latch and biasing means operatively arranged to receive an unloaded load ring or the like and to hold the ring until after loading and to eject the ring when unloaded again;

said hook body comprising an elongate portion having near one end an opening for receiving a shackle pin or the like and at the other end a slot to receive a load ring and a crotch defining a seat for supporting the load ring, said hook body having an extension from the seat to prevent a seated load ring from sliding out of the crotch;

said latch comprising a bell crank-like shape pivotally mounted to the hook body for restricted rotation relative thereto, said latch having a first normally transverse arm and a second perpendicularly extending arm, said second arm having a normal position blocking access to the hook slot, said latch arranged to permit the second arm to rotate inward toward the transverse position but not outwardly from said normal blocking position, one side of said first arm defining a cam follower surface;

means for biasing the latch in the normal blocking position;

said plunger slidably engaging the hook body and having a bearing surface against which the load ring bears when inserted in the seat and an extending pawl arm arranged to ride over the cam follower surface on said latch upon the downward movement thereof and to move into a first arm engaging position upon downward movement of the plunger; and means for biasing the plunger upwardly whereby a load ring or the like may be inserted past the latch into the slot of the hook body to rest upon the bearing surface of the plunger and then the ring cannot be withdrawn back past the latch and whereby as the load is applied to the load ring it pulls downward to the seat of the hook body carring the plunger with it and whereby when the load is removed the bearing surface of the plunger carries the load ring out of the crotch and at the same time, the pawl arm thereof kicks the latch out of the blocking position permitting the load ring to escape the hook.

2. A self-releasing hook comprising:

hook body, ejection plunger, latch and biasing means operatively arranged to receive an unloaded load ring or the like and to hold the ring until after loading and to eject the ring when unloaded again;

said hook body comprising an elongate portion having near one end an opening for receiving a shackle pin or the like and at the other end a slot and crotch defining a seat for supporting the load ring, said hook body having an extension from the seat to prevent a seated load ring from sliding out of the crotch;

said latch comprising a bell crank-like shape pivotally mounted to the hook body for restricted rotation relative thereto, said latch having a first normally transverse arm and a second perpendicularly extending arm, said second arm having a normal position blocking access to the hook slot, said latch arranged to permit the downwardly extending arm to rotate inward toward the transverse position but not outwardly from said normal blocking position, one side of said lever arm defining a cam follower surface;

means for biasing the latch in the normal blocking position;

said plunger slidably engaging the hook body and having a bearing surface against which the load ring bears when inserted in the slot and an upwardly extending pawl arm arranged to ride over the cam follower surface of said latch upon the downward movement thereof and to move into a first arm engaging position upon downward movement of the plunger;

means for biasing the plunger upwardly whereby a load ring or the like may be inserted past the latch into the slot of the hook body to rest upon the bearing surface of the plunger and the ring cannot be withdrawn back past the latch and whereby as the load is applied to the load ring it pulls downwardly to the seat of the hook body carrying the plunger with it and whereby when the load is removed the bearing surface of the plunger carries the load ring out of the crotch and at the same time, the pawl arm thereof kicks the latch out of the blocking position permitting the load ring to escape the hook; and means for latching the plunger at its downwardmost position after the load ring has carried it to said position whereby the load ring will not be ejected unless the plunger latching means has been released.

3. The self-releasing hook according to claim 1 wherein the plunger has an L-shape with a lower leg and an upwardly extending leg and the upper surface of the lower leg comprises the bearing surface and the upwardly extending leg comprises the pawl arm.

4. The self-releasing hook according to claim 3 wherein the means for biasing the plunger applies an upward force near the vertex of the L-shaped plunger whereby a load on the bearing surface and the biasing means cooperate to apply a rotating moment to the plunger to rotate the pawl arm against the latch and into the lever arm engaging position.

5. A self-releasing hook according to claim 1 wherein the plunger has an inverted T-shape with the upper surface of a lower leg comprising the bearing surface and the means for biasing the plunger upward attached to the other lower leg.

6. A self-releasing hook according to claims 3 or 5 wherein the upward extending leg of the plunger is shaped to envelop the cam follower surface of the latch when the plunger is in its loaded position sufficiently to prevent inward rotation of the latch.

7. A self-releasing hook according to claims 1 or 5 wherein upon the upward movement of the plunger, the latch is arranged to be released by rotating out of the path of the pawl arm and is then driven by the latch bias means toward the normal blocking position.

8. A self-releasing hook according to claims 4 or 5 wherein the means for biasing the plunger is a spiral spring in tension and the means for biasing the latch is a coiled torsion spring.

9. A self-releasing hook according to claims 1, 4, or 5 wherein said plunger rides in a track in the hook body that permits both translation and rotational movement of the plunger whereby the pawl arm on the downward movement thereof can ride over the cam follower surface of the latch and then rotate into a position for engaging the lever arm of the latch on the upward movement thereof.

10. A self-releasing hook according to claims 4 or 5 wherein the latch is arranged so that as the pawl arm pushes upward on the lever arm it rotates sufficiently upward and outward to escape the pawl arm.

11. A self-releasing hook according to claims 3 or 5 wherein the bearing surface of the lower leg of the plunger is beveled downward and away from the vertical extending portion of the hook so that a load ring tends to slide out of the hook when the plunger is near its upwardmost position.

12. A self-releasing hook according to claims 3 or 5 wherein the pawl arm has a saw-tooth shaped cam surface, the beveled portion of which rides upon the cam follower surface of the latch causing the pawl arm to rotate away from the latch until the beveled surface clears the latch and the pawl arm snaps back such that the perpendicular surface of the saw-tooth shaped cam engages the lever arm of the latch.

13. A self-releasing hook according to claim 1 wherein the hook portion comprises two side plates having substantially identical profiles which define the generally vertical portion, crotch and upturned extension and a spacer therebetween having a profile to define the track within which the plunger travels.

14. A self-releasing hook according to claim 13 wherein the latch, plunger, and biasing means are all substantially enclosed within the two side plates.

15. A self-releasing hook according to claim 12 wherein the perpendicular surface of the saw-tooth cam surface of the pawl arm engages the hook body to limit the upwardmost movement of the plunger.

16. A self-releasing hook according to claim 12 wherein said pawl arm has an elongate edge extending above the saw-tooth cam surface and the hook body has an elongate inwardly facing surface and whereby at least a portion of the elongate edge of the pawl arm contacts at least a portion of the inwardly facing surface except when pushed away therefrom by the cam action of a saw-tooth cam surface and the cam follower surface of the latch on the downward movement of the plunger.

17. A self-releasing hook according to claim 2 wherein the mechanical plunger latching device comprises a spring loaded sliding bolt mounted in a cylindrical guide having an axis perpendicular to a plunger plane passing through said hook body which bolt rides upon a face of the pawl arm until the pawl arm approaches its downwardmost position and then the bolt snaps into a position obstructing the upward movement of the plunger.

18. A self-releasing hook according to claim 17 wherein the sliding bolt is connected to a solenoid and can be retracted from its blocking position by energizing the solenoid.

19. A self-releasing hook comprising:
hook body, ejection plunger, latch and biasing means operatively arranged to receive an unloaded load ring or the like and to hold the ring until after loading and to eject the ring when unloaded again;
said hook body comprising a generally vertical extending portion having near its upper end an opening for receiving a shackle pin or the like and at the other end a crotch portion fixed to and integral therewith, said crotch portion defining a seat for supporting the load ring, said crotch having an upturned extension from the seat to prevent the load ring from sliding out of the seat;
said latch comprising a bell crank-like shape pivotally mounted to the hook body for restricted rotation relative thereto, said latch having a generally horizontal lever arm and a downwardly extending arm, said downwardly extending arm having a normal position blocking access to the hook seat, said latch arranged to permit the downwardly extending arm to rotate inward toward the vertical portion but not outwardly from said normal blocking position;
means for biasing the latch in the normal blocking position;
said plunger slidably engaging the hook body and having a bearing surface against which the load ring bears and an upwardly extending pawl arm arranged to ride over a cam follower surface on the lever arm of said latch upon the downward movement thereof and to move into a lever arm engaging position upon downward movement of the plunger, said plunger bearing surface beveled downward and away from the vertical portion of the hook body when near its uppermost position; and,
means for biasing the plunger upwardly whereby a load ring or the like may be inserted past the latch into the hook body to rest upon the bearing surface of the plunger and the ring cannot be withdrawn back past the latch and whereby as the load is applied to the load ring it pulls downward to the seat of the hook body carrying the plunger with it and whereby when the load is removed the bearing surface of the plunger carries the load ring out of the crotch and at the same time, the pawl arm thereof moves the latch out of the blocking position until the plunger bearing surface reaches near its uppermost position and then releases the latch which moves toward its normal blocking position kicking the load ring out of the hook.

20. A self-releasing hook comprising:

hook body, ejection plunger, latch and biasing means operatively arranged to receive an unloaded load ring or the like and to hold the ring until after loading and to eject the ring when unloaded again;

said hook body comprising a generally vertical extending portion having near its upper end an opening for receiving a shackle pin or the like and at the other end a crotch portion fixed to and integral therewith, said crotch portion defining a seat for supporting the load ring, said crotch having an upturned extension from the seat to prevent the load ring from sliding out of the seat;

said latch comprising a bell crank-like shape pivotally mounted to the hook body for restricted rotation relative thereto, said latch having a generally horizontal lever arm and a downwardly extending arm, said downwardly extending arm having a normal position blocking access to the hook seat, said latch arranged to permit the downwardly extending arm to rotate inward toward the vertical portion but not outwardly from said normal blocking position;

means for biasing the latch in the normal blocking position;

said plunger being generally L-shaped and slidably engaging the hook body and having a bearing surface against which the load ring bears and an upwardly extending pawl arm having a saw-tooth cam surface bearing upon the cam follower surface of the latch arranged to ride over a cam follower surface on the lever arm of said latch upon the downward movement thereof and to move into a lever arm engaging position when the saw-tooth cam clears the cam follower; and means for biasing the plunger upwardly applying a force near the vertex of the L-shaped plunger whereby the load ring and biasing means apply a rotating moment to the plunger forcing the pawl arm against the cam follower surface of said latch whereby a load ring or the like may be inserted past the latch into the hook body to rest upon the bearing surface of the plunger and the ring cannot be withdrawn back past the latch and whereby as the load is applied to the load ring it uplls downwardly to the seat of the hook body carrying the plunger with it and whereby when the load is removed the bearing surface of the plunger carries the load ring out of the crotch and at the same time, the pawl arm thereof kicks the latch out of the blocking position permitting the load ring to escape the hook.

* * * * *